| (12) | United States Patent<br>Caprioli et al. | (10) Patent No.: US 8,732,438 B2<br>(45) Date of Patent: May 20, 2014 |
|---|---|---|

(54) ANTI-PREFETCH INSTRUCTION

(75) Inventors: Paul Caprioli, Santa Clara, CA (US);
Sherman H. Yip, San Francisco, CA (US); Gideon N. Levinsky, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 1583 days.

(21) Appl. No.: 12/104,159

(22) Filed: Apr. 16, 2008

(65) Prior Publication Data

US 2009/0265532 A1 Oct. 22, 2009

(51) Int. Cl.
*G06F 9/30* (2006.01)

(52) U.S. Cl.
USPC .......................................... 712/207

(58) Field of Classification Search
USPC .......................................... 712/207
See application file for complete search history.

(56) References Cited

U.S. PATENT DOCUMENTS

| 6,385,715 | B1 * | 5/2002 | Merchant et al. | 712/219 |
| 6,496,925 | B1 * | 12/2002 | Kota et al. | 712/244 |
| 7,089,374 | B2 * | 8/2006 | Tremblay et al. | 711/145 |
| 7,421,544 | B1 * | 9/2008 | Wright et al. | 711/150 |

OTHER PUBLICATIONS

Zilles, Craig. Flint, David. "Challenges to Providing Performance Isolation in Transactional Memories". 8 pages, 2005.*
Wikipedia. "Spinlock" article. Feb. 24, 2008. 4 pages.*

* cited by examiner

*Primary Examiner* — Robert Fennema
(74) *Attorney, Agent, or Firm* — Park, Vaughan, Fleming & Dowler LLP; Anthony P. Jones (57) ABSTRACT

Embodiments of the present invention execute an anti-prefetch instruction. These embodiments start by decoding instructions in a decode unit in a processor to prepare the instructions for execution. Upon decoding an anti-prefetch instruction, these embodiments stall the decode unit to prevent decoding subsequent instructions. These embodiments then execute the anti-prefetch instruction, wherein executing the anti-prefetch instruction involves: (1) sending a prefetch request for a cache line in an L1 cache; (2) determining if the prefetch request hits in the L1 cache; (3) if the prefetch request hits in the L1 cache, determining if the cache line contains a predetermined value; and (4) conditionally performing subsequent operations based on whether the prefetch request hits in the L1 cache or the value of the data in the cache line.

20 Claims, 4 Drawing Sheets

FIG. 4

ANTI-PREFETCH INSTRUCTION

BACKGROUND

1. Field of the Invention

Embodiments of the present invention provide an anti-prefetch instruction. More specifically, embodiments of the present invention use an anti-prefetch instruction to facilitate parallel execution of code.

2. Related Art

In order to execute code more efficiently, multi-stranded processors have been designed to use two or more hardware strands while executing a single software thread. Some multi-stranded processors also support transactional execution, during which the processor guarantees code and memory atomicity. Transactional execution and multi-stranded processors are both known in the art and hence are not described in more detail.

In some multi-stranded processors, a section of program code can be divided into subsections and the subsections can be executed in parallel using separate strands. For example, code that inserts values from a data array into a hash table can be split into separate subsections of code that perform even and odd index array accesses. These separate subsections can then be executed in parallel using two separate strands. In such a processor, the execution of the subsections may not be independent because the strands may access the same locations in memory. To remedy this problem, the processor can execute a first subsection normally using the first strand while transactionally executing the second subsection using the second strand. Thus, if the second strand makes a memory access during the transaction that interferes with a memory access that is subsequently made by the first strand, the processor can detect the interference and can re-execute one or both of the subsections.

Because of the potential for interfering accesses, the second strand cannot finish executing the second subsection until the first strand has completed executing the first subsection. Consequently, such processors include mechanisms for ensuring that the first strand completes before the second strand commits the transaction. For example, some processors use a "spin loop" technique, wherein upon completing the first subsection, the first strand stores a predetermined value to a "mailbox" location in memory. Upon completing the second subsection, the second strand transactionally loads the mailbox to ensure that the predetermined value is stored in the mailbox before committing the transaction. Because the second stand may finish the second subsection before the first strand completes the first subsection, the second strand can transactionally load from the mailbox before the first strand stores the predetermined value to the mailbox. Unfortunately, because the second strand load-marks the cache line when performing the transactional load, the first strand, which is subsequently storing the predetermined value to the mailbox, can erroneously cause the processor to detect an interfering access and can unnecessarily cause the second strand's transaction to fail.

Hence, what is needed is a processor that supports transactional execution without the above described problem.

SUMMARY

Embodiments of the present invention provide a system that supports an anti-prefetch instruction. During operation, the system starts by decoding instructions in a decode unit in a processor to prepare the instructions for execution. Upon decoding an anti-prefetch instruction, the system stalls the decode unit to prevent the decoding of subsequent instructions. The system then executes the anti-prefetch instruction, which involves: (1) sending a prefetch request for a cache line in an L1 cache; (2) determining if the prefetch request hits in the L1 cache; (3) if so, determining if the cache line contains a predetermined value; and (4) conditionally performing subsequent operations based on whether the prefetch request hit in the L1 cache or the value of the data in the cache line.

In some embodiments, when the prefetch request misses in the L1 cache, the system conditionally performs subsequent operations by: (1) sending a fill request for the cache line to an L2 cache; (2) deferring the anti-prefetch instruction by placing the anti-prefetch instruction into a deferred queue; and (3) re-executing the deferred anti-prefetch instruction when the data returns from the L2 cache.

In some embodiments, when the prefetch request hits in the L1 cache and the cache line does not contain the predetermined value, the system conditionally performs subsequent operations by: (1) sending a fill request for the cache line to an L2 cache; (2) deferring the anti-prefetch instruction by placing the anti-prefetch instruction into a deferred queue; and (3) re-executing the deferred anti-prefetch instruction when the data returns from the L2 cache.

In some embodiments, upon executing the anti-prefetch instruction a predetermined number of times, if the cache line does not contain the predetermined value, the system fails the transaction or executes error-handling code.

In some embodiments, when the prefetch request hits in the L1 cache and the cache line contains the predetermined value, the system conditionally performs subsequent operations by resuming decoding instructions at the decode unit to prepare the instructions for execution.

In some embodiments, when determining if the cache line contains a predetermined value, the system determines the value of one or more bits in the cache line without loading the cache line into a processor register.

In some embodiments, the predetermined value is a positive value and determining the value of the bits in the cache line involves determining the value of a sign bit in the cache line.

In some embodiments, when determining if the cache line contains a predetermined value, the system loads the cache line into a processor register and determines the value in the processor register.

In some embodiments, when the system is executing a transaction, loading the cache line into a processor register involves using a non-transactional load instruction to load the cache line to the processor register without load-marking the cache line.

BRIEF DESCRIPTION OF THE FIGURES

Table 1 presents instruction fields in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory (such as L1 cache 104, L2 cache 106, memory 108, or mass-storage device 110), non-volatile memory, magnetic and optical storage devices such as disk drives, flash memories, magnetic tape, CDs (compact discs), DVDs (digital versatile discs or digital video discs), or other media capable of storing computer-readable media now known or later developed.

Terminology

The following description includes the terms "strand" and "thread." Although these terms are known in the art, the following definitions are provided to clarify the subsequent description.

A thread is a software entity that can be run on hardware. For example, a software process can be executed using one or more software threads.

A strand includes state information that is stored in hardware that is used to execute a thread. More specifically, a strand includes the software-visible architectural state of a thread, along with any other microarchitectural state required for the thread's execution. For example, a strand can include a program counter (PC), a next program counter (NPC), and one or more general-purpose registers, floating-point registers, condition-code registers, status registers, or ancillary state registers (ASRs).

Transactional Execution

Embodiments of the present invention support transactional execution. During transactional execution, these embodiments execute a critical section of code as a transaction. While executing the transaction, these embodiments protect transactional accesses from interfering accesses by other threads ("memory atomicity") and enforce the appearance of atomicity of the critical section with respect to other threads ("code atomicity"). Note that a "critical section" can be any section of the code that requires memory atomicity and code atomicity, which can range from a single instruction to a number of instructions.

Generally, before a transaction starts, these embodiments checkpoint the precise architectural state of processor 102 (see FIG. 1A-1B) to enable the recovery of the pre-transactional state in case the transaction fails. Then, during the transaction, these embodiments buffer transactional results to enable the results to be discarded in case the transaction fails. These embodiments also load-mark and store-mark cache lines loaded from and stored to ("accessed") during the transaction to facilitate determining if another thread has interfered with the transaction. If the transaction completes without interference from another thread, these embodiments atomically commit the buffered transactional results and continue executing the code following the critical section. Otherwise, the transaction fails and these embodiments delete the buffered transactional results, use the checkpoint to restore the pre-transactional state, and resume execution just before the critical section. Transactional execution is known in the art and hence is not described in more detail.

Note that load-marking and store-marking cache lines involves asserting an indicator associated with each cache line which is loaded from or stored to during the transaction. For example, in some embodiments of the present invention, a load-mark and store-mark are included in metadata associated with each cache line. In alternative embodiments, a directory is used to keep track of load-marks and store-marks for accessed cache lines.

Non-Transactional Load Instruction

Embodiments of the present invention support non-transactional load instructions. For example, processor 102 can use non-transactional load instructions during a transaction to load a cache line without load-marking the cache line. Because the cache line is not load-marked, computer system 100 does not monitor the cache line for interfering accesses by other threads.

In some embodiments of the present invention, non-transactional load instructions are implemented using an alternative address space ("ASI"). For example, in some embodiments, an address space to which transactional loads can be directed can be divided into subspaces "A" and "B." Transactional loads to address subspace A can be load-marked and hence monitored for interfering accesses by other threads, whereas transactional loads to subspace B can remain unmarked and therefore unmonitored.

Speculative Execution

Embodiments of the present invention support speculative execution. Generally, these embodiments start by executing instructions in program order in a normal-execution mode. Then, when processor 102 encounters a stall condition, these embodiments can enter a speculative execution mode to continue to perform useful computational work until the stall condition is resolved. For example, some embodiments of the present invention support execute-ahead mode, wherein instructions with unresolved data dependencies are deferred, while other non-dependent instructions are executed in program order.

During execute-ahead mode, processor 102 defers an instruction with an unresolved data dependency by placing the instruction into a deferred queue 126, then executes subsequent non-dependent instructions. While executing the subsequent instructions, processor 102 can defer instructions with unresolved data dependencies by placing these instructions into deferred queue 126 in program order. When data ultimately returns for a deferred instruction, processor 102 can make one or more passes through deferred queue 126 to execute deferred instructions that depend on the returned data. While executing these instructions, processor 102 can re-defer instructions with unresolved data dependencies by placing these instructions back into deferred queue 126 in program order. If all the deferred instructions in deferred queue 126 are executed (i.e., when deferred queue 126 is empty), processor 102 can resume execution in normal-execution mode. Otherwise, processor 102 can resume execution in execute-ahead mode until a subsequent data return.

In addition, some embodiments of the present invention can support other speculative execution modes, such as scout mode. For a detailed explanation of scout mode, see U.S. Patent Pub. No. 2005/0223201, entitled "Generating Prefetches by Speculatively Executing Code Through Hardware Scout Threading," by inventors Shailender Chaudhry and Marc Tremblay, and filing date 19 Dec. 2003

Computer System

Figure 1A:
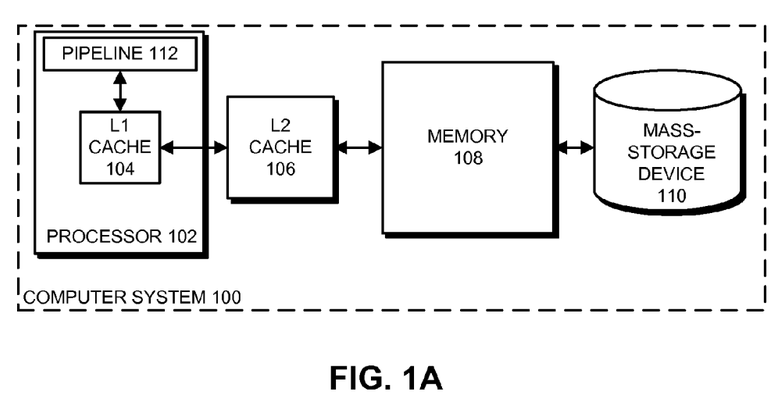
FIG. 1A presents a block diagram of a computer system in accordance with embodiments of the present invention.

FIG. 1A presents a block diagram of a computer system 100 in accordance with embodiments of the present invention. Computer system 100 includes processor 102, L2 cache 106, memory 108, and mass-storage device 110.

Processor 102 can be a general-purpose processor that performs computational operations. For example, processor 102 can be a central processing unit (CPU) such as a microprocessor. Note that processor 102 can also be a controller or an application-specific integrated circuit. Processor 102 includes L1 cache 104 and pipeline 112.

In embodiments of the present invention, processor 102 supports two or more strands. Recall that a strand includes state information which is used to execute the thread. For example, a strand can include a PC, an NPC, general-purpose registers, floating-point registers, condition-code registers, status registers, and ASRs, among other state information.

Mass-storage device 110, memory 108, L2 cache 106, and L1 cache 104 are computer-readable storage media that collectively form a memory hierarchy that stores data and instructions for processor 102. Generally, mass-storage device 110 is a high-capacity non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well-known in the art and are therefore not described in more detail.

In embodiments of the present invention, computer system 100 includes hardware mechanisms for supporting transactional execution. For example, computer system 100 can include: an indication mechanism that keeps track of when a strand (or thread) is executing a transaction; a checkpointing mechanism for checkpointing an architectural state of a strand for recovering the strand to the pre-transactional state if the associated transaction fails; a recording mechanism for recording which cache lines have been accessed during a transaction (i.e., load-marking and store-marking transactionally accessed cache lines); a monitoring mechanism for monitoring cache line accesses from other threads; and a recovery mechanism for recovering from transactional failures. Some or all of these mechanisms can be included in processor 102, L1 cache 104, L2 cache 106, memory 108, or mass-storage device 110. Alternatively, some or all of these mechanisms can be included in separate circuits within computer system 100.

Although we use specific components to describe computer system 100, in alternative embodiments different components can be present in computer system 100. For example, computer system 100 can include video cards, network cards, optical drives, and/or other peripheral devices that are coupled to processor 102 using a bus, a network, or another suitable communication channel. Alternatively, computer system 100 may include one or more additional processors, wherein the processors share some or all of L2 cache 106, memory 108, and mass-storage device 110.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, a control system (e.g., an automotive control system), or another electronic device.

Figure 1B:
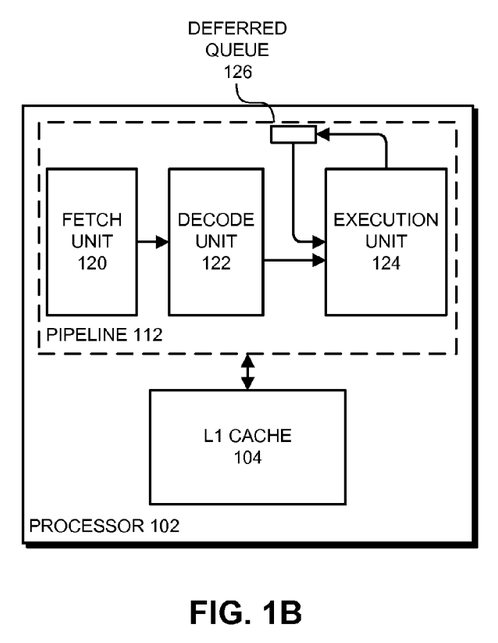
FIG. 1B presents a block diagram of a processor in accordance with embodiments of the present invention.

FIG. 1B presents a block diagram of processor 102 in accordance with embodiments of the present invention. As shown in FIG. 1B, pipeline 112 includes fetch unit 120, decode unit 122, and execution unit 124. Pipeline 112 is used to execute instructions from program code.

Within pipeline 112, fetch unit 120 fetches instructions from L1 cache 104 (or from higher levels of the memory hierarchy) for execution in processor 102. Decode unit 122 decodes the fetched instructions and prepares the instructions for execution in execution unit 124. Execution unit 124 executes instructions forwarded from decode unit 122. Execution unit 124 can include one or more floating point execution units, integer execution units, branch execution units, and/or memory execution units. Note that although pipeline 112 includes specific components, in some embodiments of the present invention the pipeline can include more or less components.

Pipeline 112 also includes deferred queue 126, which is used by processor 102 to store deferred instructions so that the deferred instructions can be executed at a later time.

Pipelines are well-known in the art and hence are not described in more detail.

Anti-Prefetch Instruction

Embodiments of the present invention provide an anti-prefetch instruction. Anti-prefetch instructions cause processor 102 to stall the execution of subsequent instructions unless an associated cache line contains a predetermined value. In these embodiments, the predetermined value can be a particular numerical value, a positive or negative value, a non-zero value, or another value.

This anti-prefetch instruction differs from the typical "prefetch" instruction in existing systems. A prefetch instruction causes a system to retrieve a cache line in anticipation of a subsequent access while the system continues to execute instructions. For example, in some systems, a compiler can optimize program code during compilation so that prefetches are placed in the compiled code before the associated memory access to "warm up" or prepare the cache lines for the access. In contrast, in embodiments of the present invention, anti-prefetch instructions fetch the cache line but stall the subsequent decoding of instructions unless the value in the cache line satisfies a predetermined condition.

Anti-Prefetch Instruction Format

Some embodiments of the present invention use an existing prefetch instruction format for the anti-prefetch instruction.

Figure 2:
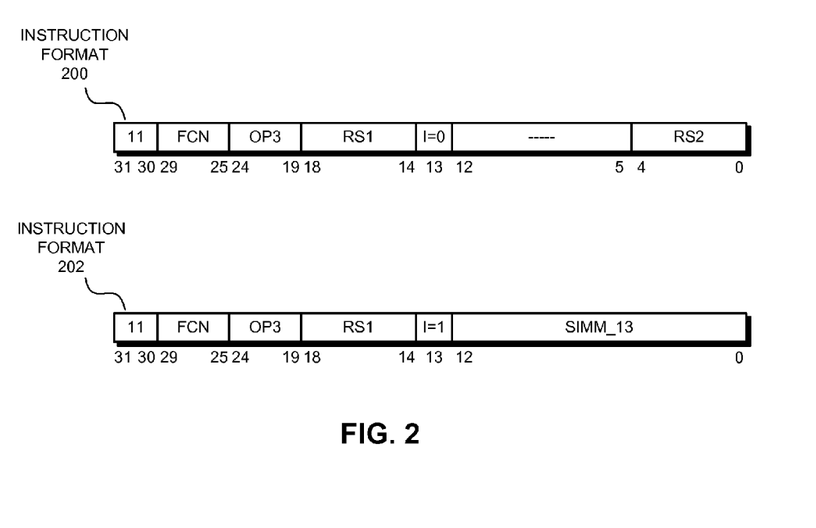
FIG. 2 presents exemplary anti-prefetch instruction formats in accordance with embodiments of the present invention.

For example, FIG. 2 presents exemplary anti-prefetch instruction formats 200-202 in accordance with embodiments of the present invention. The exemplary anti-prefetch instruction formats in FIG. 2 are similar to the prefetch instruction formats used in the SPARC™ Architecture from SPARC International, Inc. of Santa Clara, Calif., USA.

Each anti-prefetch instruction format 200-202 includes 32 bits, which are divided into a number of fields. For example, instruction format 200 is divided into 7 fields, while instruction format 202 is divided into 6 fields. In instruction formats 200-202, the fields indicate the following.

TABLE 1

Instruction Fields

| | |
|---|---|
| FCN | A control field that indicates the type of prefetch/anti-prefetch instruction. |
| OP3 | An encoded portion of the opcode for the prefetch/anti-prefetch instruction. |
| RS1-RS2 | Address(es) for source register(s) for the prefetch/anti-prefetch instruction. |
| SIMM_13 | An immediate value that is sign-extended to 64 bits and used as the second operand for the prefetch/anti-prefetch instruction when i = 1. |
| I | An indicator bit that is used to select the second operand. If i = 0, r[rs2] is selected as the operand. If i = 1, simm_13, sign-extended to 64 bits, is selected as the operand. |

Although we describe embodiments of the present invention that use the SPARC™ prefetch instruction format for the anti-prefetch instruction, alternative embodiments of the present invention work with other architectures and instruction formats using the same principles. For example, in alternative embodiments, a unique anti-prefetch instruction format is used.

In some embodiments of the present invention, anti-prefetch instruction can be directed to an alternative address space ("ASI"). The ASI can be used for a corresponding load instruction to simultaneously stall instruction decoding for subsequent instructions while loading the cache line for the value determination. These embodiments can use a non-transactional load instruction to load the value from the cache line into a processor register before performing the comparison.

In embodiments of the present invention, the anti-prefetch instruction enables communication from a non-transactional strand to a transactional strand without the high probability of failure of a transactional spin-loop in existing systems.

Anti-Prefetch Instruction Operations

Figure 3:
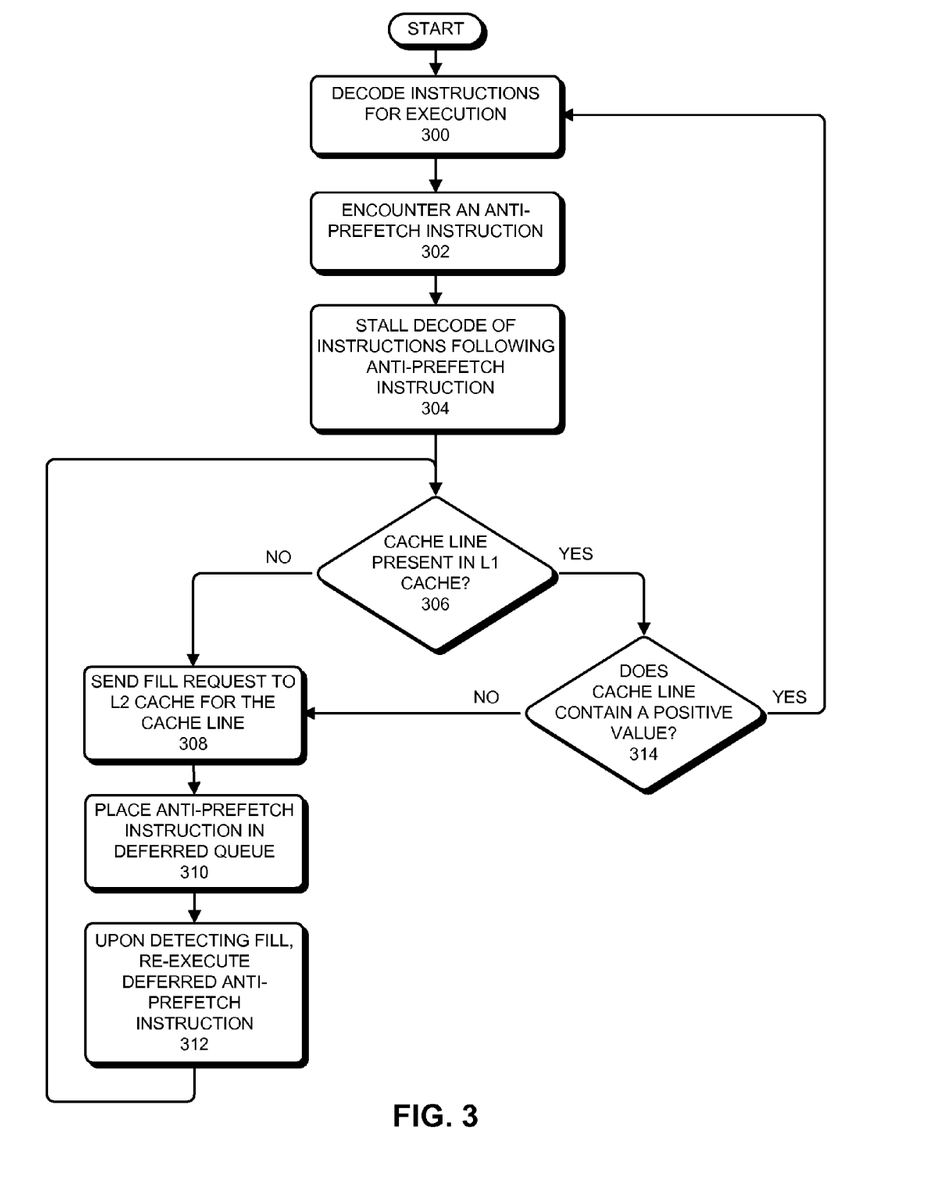
FIG. 3 presents a flowchart illustrating the operations performed by a processor when executing an anti-prefetch instruction in accordance with embodiments of the present invention.

FIG. 3 presents a flowchart illustrating the operations performed by processor 102 when executing an anti-prefetch instruction in embodiments of the present invention. The process starts with decode unit 122 decoding instructions for execution (step 300).

Upon encountering an anti-prefetch instruction (step 302), processor 102 stalls the decoding of the subsequent instructions (step 304). Note that while execution of instructions that follow the anti-prefetch instruction is stalled, some embodiments of the present invention can use the strand to perform unrelated computational operations.

Processor 102 then determines if the cache line specified by the anti-prefetch instruction is present in L1 cache 104 (step 306) (i.e., if L1 cache 104 returns a "hit" for the cache line). If the cache line is not present in L1 cache 104 (i.e., L1 cache 104 returns a "miss" for the cache line), processor 102 sends a fill request to L2 cache 106 for the cache line (step 308). Processor 102 also defers the anti-prefetch instruction by placing the anti-prefetch instruction into deferred queue 126 (step 310). While the anti-prefetch instruction remains in deferred queue 126, decode unit 122 remains stalled, thereby preventing the following instructions from executing. Upon subsequently detecting that the cache line has been filled, processor 102 re-executes the deferred anti-prefetch instruction (step 312).

Otherwise, if the cache line is present in L1 cache 104, processor 102 determines if the cache line contains a predetermined value (step 314). Some embodiments of the present invention determine if the cache line contains a predetermined value without loading the cache line into a processor register. For example, assuming that the determination is whether the cache line contains a positive value, these embodiments can determine the value of the sign bit in the cache line (e.g., bit [63] of a 64-bit value). To enable this determination, the sign bit of the cache line can be communicated directly to a comparison circuit to make the determination.

Alternative embodiments use other techniques for determining the value in the cache line. For example, some embodiments use a compare operation, during which the cache line is loaded into a processor register. For example, these embodiments can use a non-transactional load to perform the load operation.

If the cache line contains the predetermined value, these embodiments return to step 300 to resume decoding the instructions following the anti-prefetch instruction.

On the other hand, if the cache line contains a negative value, processor 102 sends a fill request to L2 cache 106 (step 308). Processor 102 also re-defers the anti-prefetch instruction by placing the anti-prefetch instruction into deferred queue 126 (step 310). Upon subsequently detecting that the cache line has been filled, processor 102 re-executes the deferred anti-prefetch instruction (step 312).

Note that if the predetermined value is never present in the cache line, these embodiments can re-defer and re-execute the anti-prefetch instruction in an endless loop. Hence, some embodiments of the present invention automatically ensure that the predetermined value is eventually written to the cache line. For example, these embodiments can fail the transaction or execute error-handling code when the anti-prefetch instruction has been re-deferred a predetermined number of times. In other embodiments, the programmer or compiler must ensure that the predetermined value is eventually written into the cache line.

Parallelizing Execution of a Thread

In embodiments of the present invention, a section of program code can be divided into subsections and each subsection can be executed using a separate strand. For example, code that inserts values from a data array into a hash table can be split into separate subsections of code that perform even and odd index array accesses. These separate subsections which can then be executed in parallel using two separate strands. In these embodiments, the execution of the subsections may not be independent because the strands may access the same locations in memory. To remedy this problem, these embodiments can execute a first subsection normally using a first strand while transactionally executing the second subsection using a second strand. If the second strand makes a memory access during the transaction that interferes with a memory access that is subsequently made by the first strand, these embodiments can detect the interference and can cause one or both of the subsections to be re-executed.

Due to the potential for interfering accesses, the second strand cannot finish executing the second subsection until the first strand has completed executing the first subsection. Consequently, upon completing the first subsection, the first strand can store a predetermined value to a "mailbox" location in memory. Upon completing the second subsection, the second strand checks the mailbox for the predetermined value before committing the transaction for the second subsection.

In embodiments of the present invention, the second strand uses an anti-prefetch instruction when checking the mailbox determine if the predetermined value is stored in the mailbox. Unlike the load operation performed by existing systems, the anti-prefetch instruction enables these systems to determine when the first subsection has completed without causing unnecessary transaction failures.

Process of Executing Subsections of Program Code in Parallel

Figure 4:
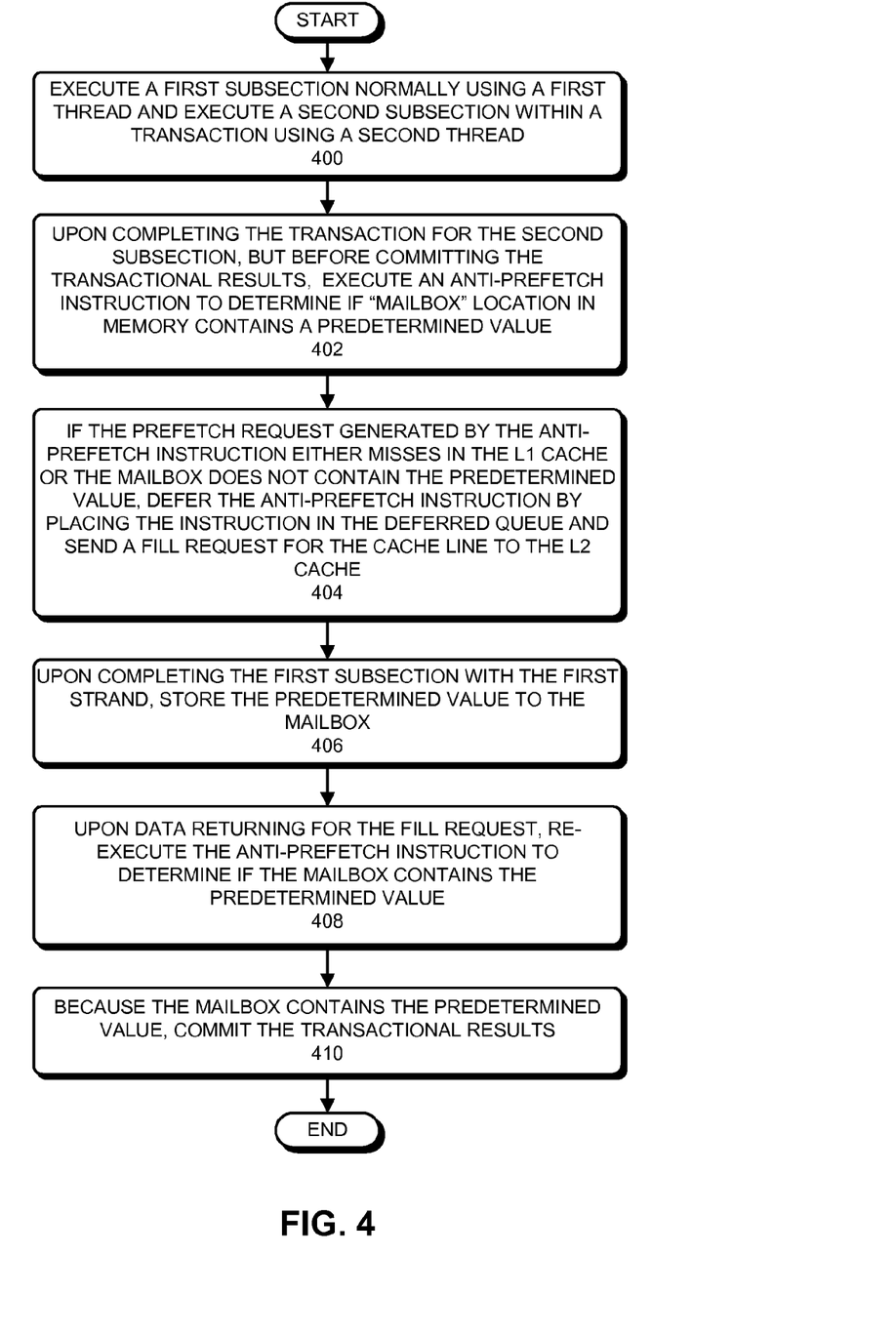
FIG. 4 presents a flowchart illustrating the process of executing subsections of program code in parallel in accordance with embodiments of the present invention.

FIG. 4 presents a flowchart illustrating the process of executing subsections of program code in parallel in accordance with embodiments of the present invention. For the purposes of illustration, we assume that a first subsection of the program code is executed using a first strand and a second subsection of the program code is executed in a transaction using a second strand. We further assume that the second strand finishes the transaction before the first strand completes the first subsection and that the first strand writes a predetermined value to the mailbox upon completing the first subsection.

The process starts with processor 102 executing the first subsection normally using the first strand and executing the second subsection within a transaction using the second strand (step 400). If the second strand makes a memory access during the transaction that interferes with a memory access that is subsequently made by the first strand, processor 102 can: detect the interference; fail the second strand's transaction; and cause one or both of the strands to re-execute the corresponding subsections.

Upon completing the transaction for the second subsection but before committing the transaction, processor 102 executes an anti-prefetch instruction to determine if a "mailbox" location in memory contains the predetermined value (step 402). Upon decoding the anti-prefetch instruction in decode unit 122, processor 102 stalls decode unit 122 to prevent instructions following the anti-prefetch instruction from being decoded. Stalling decode unit 122 prevents the execution of further transactional instructions, thereby preventing the transaction from committing.

Processor 102 then forwards the anti-prefetch instruction to execution unit 124 for execution. Executing the anti-prefetch instruction causes processor 102 to send a prefetch request for the cache line that contains the mailbox. Processor 102 then determines if the prefetch request misses in L1 cache 104 or, in the case where the prefetch request hits in L1 cache 104, if the mailbox contains the predetermined value. Recall that determining if the mailbox contains the predetermined value can involve reading one or more bits from the cache line. Alternatively, determining if the mailbox contains the predetermined value can involve or using a non-transactional load instruction to load the cache line into a processor register and then determining the value in the processor register.

However, because the first strand has not completed the first subsection, the prefetch request either misses in the L1 cache or the mailbox does not contain the predetermined value. Hence, processor 102 defers the anti-prefetch instruction by placing the instruction in deferred queue 126 and sends a fill request for the cache line to L2 cache 106 (step 404). When the data subsequently returns from L2 cache 106, processor 102 re-executes the deferred anti-prefetch instruction. (Processor 102 may re-execute the anti-prefetch one or more times before the first strand writes the predetermined value into the mailbox location.)

Upon subsequently completing the first subsection with the first strand, processor 102 stores the predetermined value to the mailbox (step 406). When data eventually returns from a fill request that was sent to L2 cache 106 while executing the anti-prefetch instruction, processor 102 re-executes the anti-prefetch instruction to determine if the mailbox contains the predetermined value (step 408). Because the first thread has written the predetermined value to the mailbox, the anti-prefetch instruction successfully completes, causing processor 102 to release the stall on decode unit 122. Decode unit 122 then resumes decoding transactional instructions and committing the transaction (step 410).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing an anti-prefetch instruction, comprising:
   decoding instructions in a decode unit in a processor to prepare the instructions for execution;
   upon decoding an anti-prefetch instruction, stalling the decode unit to prevent the decoding of subsequent instructions;
   executing the anti-prefetch instruction, wherein executing the anti-prefetch instruction involves:
   sending a prefetch request for a cache line in an L1 cache;
   determining if the prefetch request misses in the L1 cache;
     if the prefetch request hits in the L1 cache, determining if the cache line contains a predetermined value; and
     conditionally performing subsequent operations based on whether the prefetch request missed in the L1 cache or the value of the data in the cache line,
   wherein stalling the decode unit to prevent the decoding of the subsequent instructions comprises preventing the decoding of subsequent instructions for a thread that comprises the anti-prefetch instruction and preventing the decoding of all instructions for another thread, the another thread causing the predetermined value to be written to the cache line.

2. The method of claim 1, wherein if the prefetch request misses in the L1 cache, conditionally performing subsequent operations involves:
   sending a fill request for the cache line to an L2 cache;
   deferring the anti-prefetch instruction by placing the anti-prefetch instruction into a deferred queue; and
   re-executing the deferred anti-prefetch instruction when the data returns from the L2 cache.

3. The method of claim 1, wherein if the prefetch request hits in the L1 cache and the cache line does not contain the predetermined value, conditionally performing subsequent operations involves:
   sending a fill request for the cache line to an L2 cache;
   deferring the anti-prefetch instruction by placing the anti-prefetch instruction into a deferred queue; and
   re-executing the deferred anti-prefetch instruction when the data returns from the L2 cache.

4. The method of claim 3, wherein upon executing the anti-prefetch instruction a predetermined number of times, if the cache line does not contain the predetermined value, the method further comprises failing the transaction or executing error-handling code.

5. The method of claim 1, wherein if the prefetch request hits in the L1 cache and the cache line contains the predetermined value, conditionally performing subsequent operations involves resuming the decoding of instructions at the decode unit to prepare the instructions for execution.

6. The method of claim 1 wherein determining if the cache line contains a predetermined value involves determining the value of one or more bits in the cache line without loading the cache line into a processor register.

7. The method of claim 6, wherein the predetermined value is a positive value and determining the value of one or more bits in the cache line involves determining the value of a sign bit in the cache line.

8. The method of claim 1, wherein determining if the cache line contains a predetermined value involves loading the cache line into a processor register and determining the value in the processor register.

9. The method of claim 8, wherein the processor is executing a transaction and loading the cache line into a processor register involves using a non-transactional load instruction to load the cache line into the processor register without load-marking the cache line.

10. The method of claim 1, wherein stalling the decode unit to prevent the decoding of the subsequent instructions comprises preventing the decoding of all instructions for all threads that are executing on the processor.

11. An apparatus that executes an anti-prefetch instruction, comprising:
a decode unit in a processor, wherein the decode unit decodes instructions to prepare the instructions for execution;
wherein upon determining that the decode unit has decoded an anti-prefetch instruction, the processor is configured to stall the decode unit to prevent the decoding of subsequent instructions;
wherein the processor is configured to execute the anti-prefetch instruction by:
sending a prefetch request for a cache line in an L1 cache;
determining if the prefetch request misses in the L1 cache;
if the prefetch request hits in the L1 cache, determining if the cache line contains a predetermined value; and
wherein the processor is configured to conditionally perform subsequent operations based on whether the prefetch request missed in the L1 cache or the value of the data in the cache line, and
wherein, while stalling the decode unit to prevent the decoding of the subsequent instructions, the processor is configured to prevent the decoding of subsequent instructions for a thread that comprises the anti-prefetch instruction and preventing the decoding of all instructions for another thread, the another thread causing the predetermined value to be written to the cache line.

12. The apparatus of claim 11, wherein if the prefetch request misses in the L1 cache, the processor is configured to:
send a fill request for the cache line to an L2 cache;
defer the anti-prefetch instruction by placing the anti-prefetch instruction into a deferred queue; and
re-execute the deferred anti-prefetch instruction when the data returns from the L2 cache.

13. The apparatus of claim 11, wherein if the prefetch request hits in the L1 cache and the cache line does not contain the predetermined value, the processor is configured to:
send a fill request for the cache line to an L2 cache;
defer the anti-prefetch instruction by placing the anti-prefetch instruction into a deferred queue; and
re-execute the deferred anti-prefetch instruction when the data returns from the L2 cache.

14. The apparatus of claim 13, wherein upon executing the anti-prefetch instruction a predetermined number of times, if the cache line does not contain the predetermined value, the processor is configured to fail the transaction or execute error-handling code.

15. The apparatus of claim 11, wherein if the prefetch request hits in the L1 cache and the cache line contains the predetermined value, the processor is configured to resume the decoding of instructions at the decode unit to prepare the instructions for execution.

16. A method for executing sections of program code in parallel in a processor using an anti-prefetch instruction, comprising:
executing a first section of program code using a first strand;
simultaneously executing a second section of program code within a transaction using a second strand, wherein the second strand does not commit a set of transactional results until a predetermined value is written to a cache line in an L1 cache by the first strand when the first strand has completed the first section; and
upon completing the transaction using the second strand, executing an anti-prefetch instruction to determine if the cache line contains the predetermined value, wherein, upon decoding the anti-prefetch instruction, a decode unit for the processor is stalled to prevent decoding of subsequent instructions, and wherein stalling the decode unit to prevent the decoding of the subsequent instructions comprises preventing the decoding of subsequent instructions for a thread that comprises the anti-prefetch instruction and preventing the decoding of all instructions for the first strand and the second strand.

17. The method of claim 16, wherein executing the anti-prefetch instruction involves:
sending a prefetch request for the cache line;
determining if the prefetch request misses in the L1 cache;
if the prefetch request hits in the L1 cache, determining if the cache line contains the predetermined value; and
if the prefetch request misses in the L1 cache or if the cache line does not contain the predetermined value, deferring the anti-prefetch instruction by placing the anti-prefetch instruction into a deferred queue, sending a fill request for the cache line to an L2 cache, and re-executing the deferred anti-prefetch instruction when data returns; and
if the cache line contains the predetermined value, committing the transaction.

18. The method of claim 17, wherein determining if the cache line contains a predetermined value involves determining the value of one or more bits in the cache line without loading the cache line into a processor register.

19. The method of claim 18, wherein the predetermined value is a positive value and determining the value of one or more bits in the cache line involves determining the value of a sign bit in the cache line.

20. The method of claim 17, wherein determining if the cache line contains a predetermined value involves using a non-transactional load instruction to load the cache line to a processor register without load-marking the cache line and determining the value in the processor register.

* * * * *